United States Patent
Qi et al.

(10) Patent No.: US 12,475,613 B2
(45) Date of Patent: Nov. 18, 2025

(54) SCATTER ESTIMATION FOR PET FROM IMAGE-BASED CONVOLUTIONAL NEURAL NETWORK

(71) Applicants: The Regents of the University of California, Oakland, CA (US); CANON MEDICAL SYSTEMS CORPORATION, Tochigi (JP)

(72) Inventors: Jinyi Qi, Oakland, CA (US); Tiantian Li, Oakland, CA (US); Zhaoheng Xie, Oakland, CA (US); Wenyuan Qi, Vernon Hills, IL (US); Li Yang, Vernon Hills, IL (US); Chung Chan, Vernon Hills, IL (US); Evren Asma, Vernon Hills, IL (US)

(73) Assignees: The Regents of the University of California, Oakland, CA (US); CANON MEDICAL SYSTEMS CORPORATION, Tochigi (JP)

( * ) Notice: Subject to any disclaimer, the term of this patent is extended or adjusted under 35 U.S.C. 154(b) by 552 days.

(21) Appl. No.: 17/682,738

(22) Filed: Feb. 28, 2022

(65) Prior Publication Data
US 2023/0206516 A1 Jun. 29, 2023

Related U.S. Application Data

(60) Provisional application No. 63/293,395, filed on Dec. 23, 2021.

(51) Int. Cl.
*G06K 9/00* (2022.01)
*A61B 6/00* (2006.01)
(Continued)

(52) U.S. Cl.
CPC .......... *G06T 11/005* (2013.01); *A61B 6/027* (2013.01); *A61B 6/032* (2013.01); *A61B 6/037* (2013.01);
(Continued)

(58) Field of Classification Search
None
See application file for complete search history.

(56) References Cited

U.S. PATENT DOCUMENTS

| 11,145,055 B2 | 10/2021 | Jin et al. |
| 2021/0383582 A1* | 12/2021 | De Man ................ G06T 7/20 |
| 2022/0091286 A1* | 3/2022 | Panin ................... G06N 3/08 |

FOREIGN PATENT DOCUMENTS

WO   WO 2021/159948 A1   8/2021

OTHER PUBLICATIONS

Jaewon Yang, et al., "Joint Correction of Attenuation and Scatter Using Deep Convolutional Neural Networks (DCNN) for Time-of-Flight PET", Computer Science > Computer Vision and Pattern Recognition, Apr. 4, 2019, 4 pages.
(Continued)

*Primary Examiner* — Wei Wen Yang
(74) *Attorney, Agent, or Firm* — Oblon, McClelland, Maier & Neustadt, L.L.P.

(57) ABSTRACT

A method, system, and computer readable medium to perform nuclear medicine scatter correction estimation, sinogram estimation and image reconstruction from emission and attenuation correction data using deep convolutional neural networks. In one embodiment, a Deep Convolutional Neural network (DCNN) is used, although multiple neural networks can be used (e.g., for angle-specific processing). In one embodiment, a scatter sinogram is directly estimated using a DCNN from emission and attenuation correction data. In another embodiment a DCNN is used to estimate a
(Continued)

scatter-corrected image and then the scatter sinogram is computed by a forward projection.

18 Claims, 11 Drawing Sheets

(51) Int. Cl.
*A61B 6/02* (2006.01)
*A61B 6/03* (2006.01)
*G06T 3/40* (2006.01)
*G06T 7/00* (2017.01)
*G06T 11/00* (2006.01)

(52) U.S. Cl.
CPC .............. *A61B 6/5282* (2013.01); *G06T 3/40* (2013.01); *G06T 7/0014* (2013.01); *G06T 2207/10081* (2013.01); *G06T 2207/10104* (2013.01); *G06T 2207/20081* (2013.01); *G06T 2207/20084* (2013.01); *G06T 2207/30004* (2013.01); *G06T 2210/41* (2013.01); *G06T 2211/441* (2023.08); *G06T 2211/452* (2023.08)

(56) References Cited

OTHER PUBLICATIONS

Hossein Arabi, et al., "Deep learning-guided joint attenuation and scatter correction in multitracer neuroimaging studies", Human Brain Mapping, vol. 41, Issue 13, May 21, 2020, pp. 1-13.
Kuang Gong, et al., "Machine Learning in PET: from Photon Detection to Quantitative Image Reconstruction", Proceedings of the IEEE, vol. 108, Issue 1, Sep. 19, 2019, pp. 51-68.

* cited by examiner

For non-TOF scatter, projections will be in 2D
For TOF scatter, projections will be in 3D.

For non-TOF scatter, projections will be in 2D
For TOF scatter, projections will be in 3D.

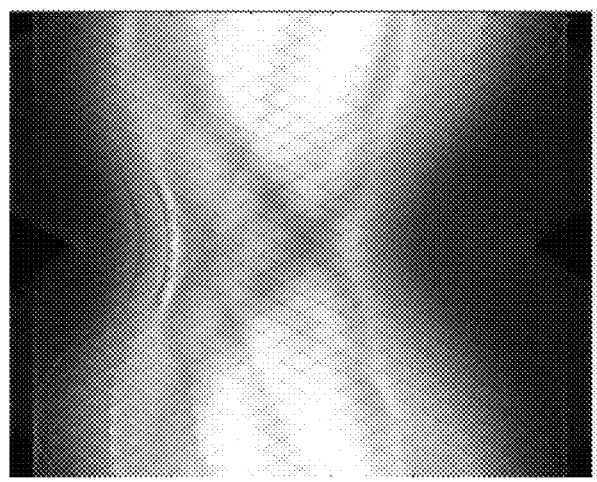
$Px_s$
Forward Projection
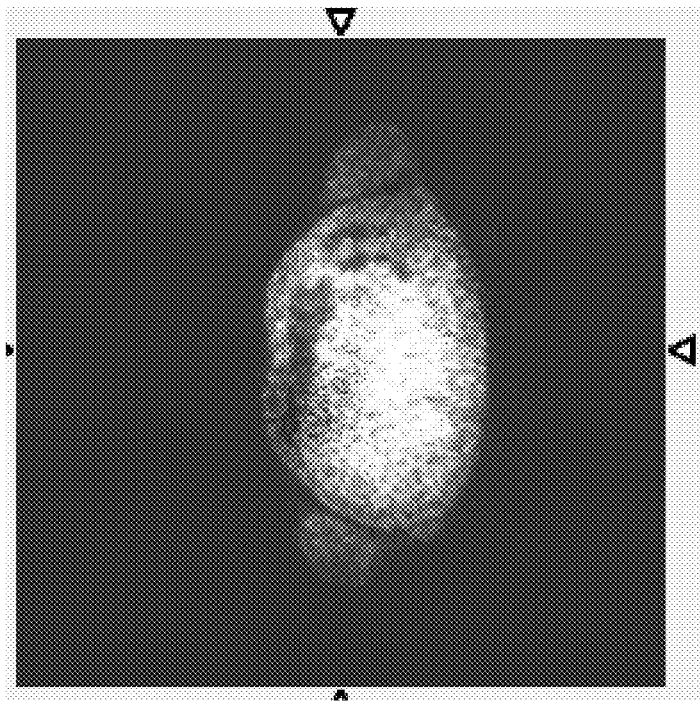
$x_s$
FIG. 4

SCATTER ESTIMATION FOR PET FROM IMAGE-BASED CONVOLUTIONAL NEURAL NETWORK

FIELD OF THE INVENTION

The present invention is directed to a method and system for providing scatter correction in nuclear medicine images (e.g., Positron Emission Tomography (PET) images), corrected image estimation, scatter sinogram estimation, and/or nuclear medicine image reconstruction.

BACKGROUND

Scatter is one of the main degrading factors for reconstructed PET image quality. Currently, there are two main approaches to scatter correction: 1. Monte Carlo simulations and 2. Model-based scatter simulations. These are described in *A single scatter simulation technique for scatter correction in 3D PET* by Watson, C. C., et al., 1996, online ISBN: 978-94-015-8749-5 incorporated herein by reference. It is also described in *Extension of Single Scatter Simulation to Scatter Correction of Time-of-Flight PET*, Watson, C IEEE Transactions on Nuclear Science, vol 54, no. 5, pp. 1679-1686, October 2007, doi: 10.1109/TNS.2007.901227 incorporated herein by reference, Monte Carlo simulations are disclosed in Ma B, Gaens M, Caldeira L, Bert J, Lohmann P, Tellmann L, Lerche C, Scheins J, Rota Kops E, Xu H, Lenz M, Pietrzyk U, Shah N J, *Scatter Correction Based on GPU-Accelerated Full Monte Carlo Simulation for Brain PET/MRI*; IEEE Trans Med Imaging. 2020 January; 39(1): 140-151. doi: 10.1109/TMI.2019.2921872; 2019 Jun. 10; PMID: 31180843, the contents of which are incorporated herein by reference.

Monte Carlo simulations are very accurate and include all scattered events but are too slow for utilization in many real-time environments. By comparison, known model-based single scatter simulation is relatively faster, but it is still a time consuming part of the reconstruction process. Furthermore, it only predicts single scatter sinograms, which necessitates another prediction step for multiple scattered events. The recent work by Watson demonstrates that second order scattered events could also be modeled as part of model-based simulations and that the resulting sinograms come very close to full scatter sinograms. Nonetheless, the method has high complexity and a high computational cost.

Deep convolutional neural networks (DCNN) are a widely used machine learning technique for image processing with various implementations on image segmentation and image denoising as described in (1) *CNN-based Segmentation of Medical Imaging Data*, Kayalibay, B., et al, 2017 CoRR, 2017 and (2) *PET Image Denoising Using a Deep Neural Network Through Fine Tuning*, Gong, K., et al, IEEE Transactions on Radiation and Plasma Medical Sciences, 2018. The contents of both of those references are incorporated herein by reference. DCNNs used in diagnostic prediction are described in *Predicting Response to Neoadjuvant Chemotherapy with PET Imaging Using Convolutional Neural Networks*, Ypsilantis P-P, Siddique M, Sohn H-M, Davies A, Cook G, Goh V, et al., PLoS ONE 10(9), 2015, the contents of which also are incorporated herein by reference.

In general, a DCNN includes several steps such as convolutions, stride, pooling, and padding. During convolution, the network extracts targeted features from input data with the use of a kernel.

Two known techniques for using DCNN for PET scatter estimation are (1) estimation of multiple scatter sinograms from single scatter sinograms and (2) estimation of scatter sinograms directly from emission and attenuation sinograms. This latter approach is challenging because scatter is not physically generated by emission or attenuation sinograms and there is no direct relationship between these sinograms and scatter sinograms. Also, intrinsic image features which affect scatter cannot be detected from these sinograms.

SUMMARY

As described herein, machine learning-based systems (e.g., deep convolutional neural networks (DCNN)) are used to estimate scatter directly from a nuclear medicine image (e.g., an image from a PET scan) and based on an attenuation correction data in a nuclear medicine diagnosis apparatus. In order to train using realistic output data during the training process, according to one aspect of the methods described herein, at least one of a Monte Carlo simulation and a model-based scatter correction method may be used to produce training data sets that estimate the full scatter effect.

In one embodiment, a machine learning-based system to be trained includes, but is not limited to, a neural network, and the trained machine learning-based system includes, but is not limited to, a trained deep convolutional neural network.

In another embodiment, the machine learning-based system comprises plural neural networks, and at least one of the networks produces a forward projection angle-specific scatter correction.

Note that this summary section does not specify every embodiment and/or incrementally novel aspect of the present disclosure or claimed invention. Instead, this summary only provides a preliminary discussion of different embodiments. For additional details and/or possible perspectives of the invention and embodiments, the reader is directed to the Detailed Description section and corresponding figures of the present disclosure as further discussed below.

BRIEF DESCRIPTION OF THE DRAWINGS

FIG. 4 is a data diagram showing a difference image of FIG. 3 undergoing forward projection to produce a pseudo scatter sinogram to perform scatter correction.

DETAILED DESCRIPTION

In nuclear medical imaging, Positron Emission Tomography (PET) scans are subject to scattering that reduces image quality. In order to correct for the scatter, a real-time correction process is described herein that utilizes a machine-learning based correction system, and in one embodiment uses a Deep Convolutional Neural network (DCNN). In one embodiment, a scatter sinogram is directly estimated using a DCNN from emission and attenuation correction data. In another embodiment a DCNN is used to estimate a scatter-corrected image and then the scatter sinogram is computed by a forward projection.

In both embodiments, a DCNN can be implemented as a U-Net like structure, but the network structure is not limited thereto. Other different combinations of basic neural network elements such as convolution operations, activation functions, max pooling and batch normalization could be used as well. The network training is to minimize a loss function, which reflects a similarity between predicted images (or sinograms) and ground truth scatter corrected images (or scatter sinograms). The parameters of those networks will form the trained network to be used with a new pair of images. Different similarity metrics can be applied to measure the similarity between the prediction and ground truth. These can include, but are not limited to, root mean square error, weighted sums of intensity differences, cross correlation, adversarial loss, and mutual information between image histograms.

Figure 1A:
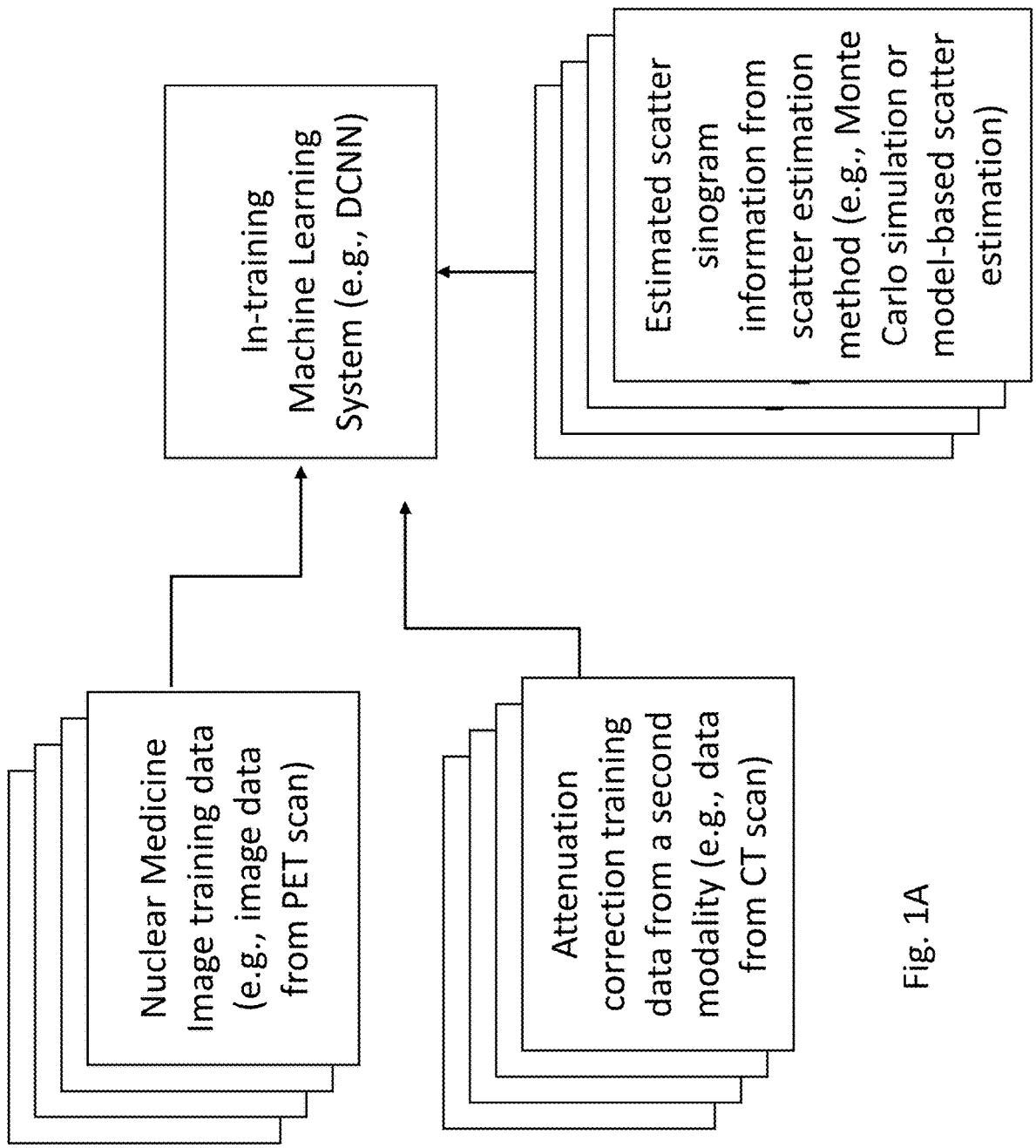
FIG. 1A shows a machine learning-based system (e.g., a deep convolutional neural network (DCNN)) being trained to directly produce an estimated scatter sinogram from nuclear medicine training image data (e.g., images from a plurality of PET scans) and corresponding sets of training attenuation correction data (e.g., attenuation images/maps and/or data from a three-dimensional model of radiation attenuation) using estimated scatter data produced by at least one other method (e.g., a Monte Carlo simulation and/or a model-based method).

FIG. 1A shows a machine learning-based system (e.g., a DCNN) being trained to estimate scatter from a set of training image data representing plural time of Flight (TOF) reconstructions without scatter correction and a corresponding set of training attenuation correction data (e.g., produced from a three-dimensional model of radiation attenuation or a set of attenuation images). In one embodiment, the set of training attenuation correction data is obtained from a number of helical computed tomography (CT) scans which are input into the machine learning-based system along with the PET image data. Alternatively, the attenuation correction data can be corresponding data obtained from a three-dimensional model of radiation attenuation. Before DCCN training, attenuation correction data should be registered to nuclear medicine image. The machine learning-based system is then trained to emulate target scatter information generated using an alternate scatter estimation method (e.g., using a Monte Carlo simulation or a model-based method).

The resulting trained machine learning-based system (e.g., shown in FIGS. 1B and 1C) can then produce an estimated scatter sinogram from later input image data and corresponding attenuation correction data of the kinds used to train the trained system. Exemplary images are shown in conjunction with the data flow diagram of FIG. 1C.

Figure 1B:
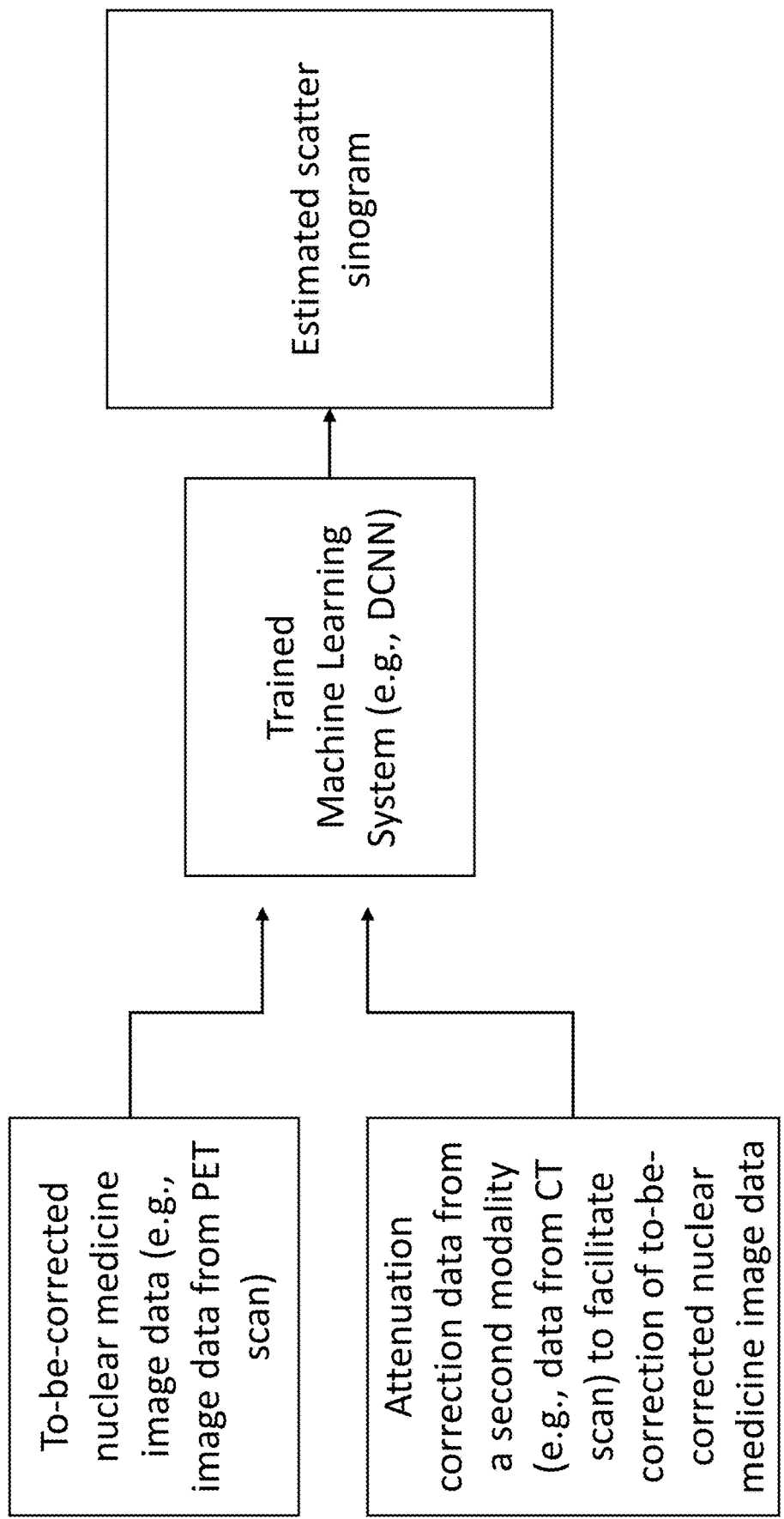
FIG. 1B shows a trained machine learning-based system (e.g., a DCNN) directly producing an estimated scatter sinogram from a nuclear medicine image (e.g., an image from a PET scan) and attenuation correction data (e.g., an attenuation image/map and/or data from a three-dimensional model of radiation attenuation) of the kind(s) used to train the trained machine learning-based system.
Figure 1C:
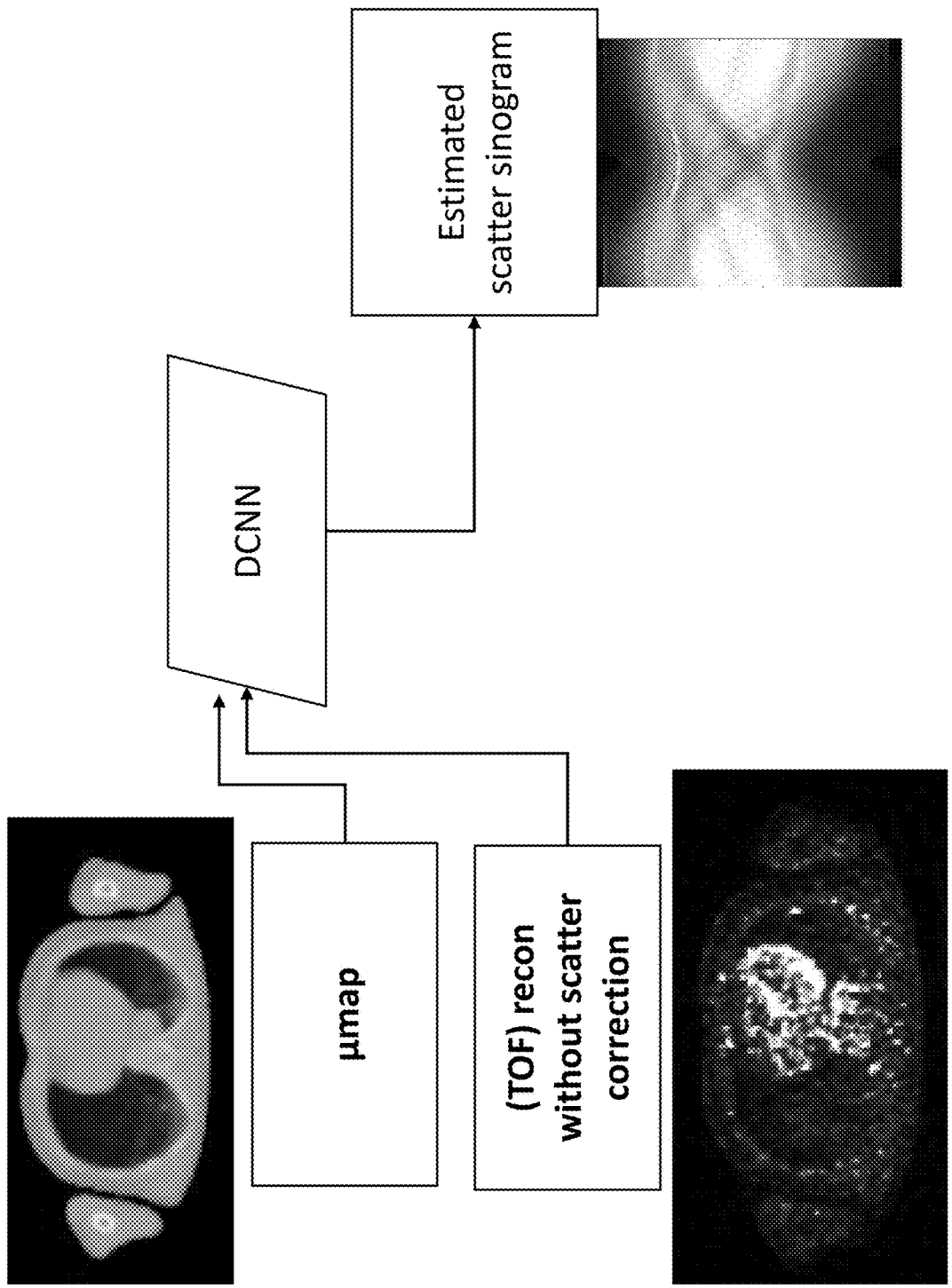
FIG. 1C shows the method and system of FIG. 1B utilizing exemplary images for the estimated scatter sinogram, a nuclear medicine image, and attenuation correction data.
Figure 1D:
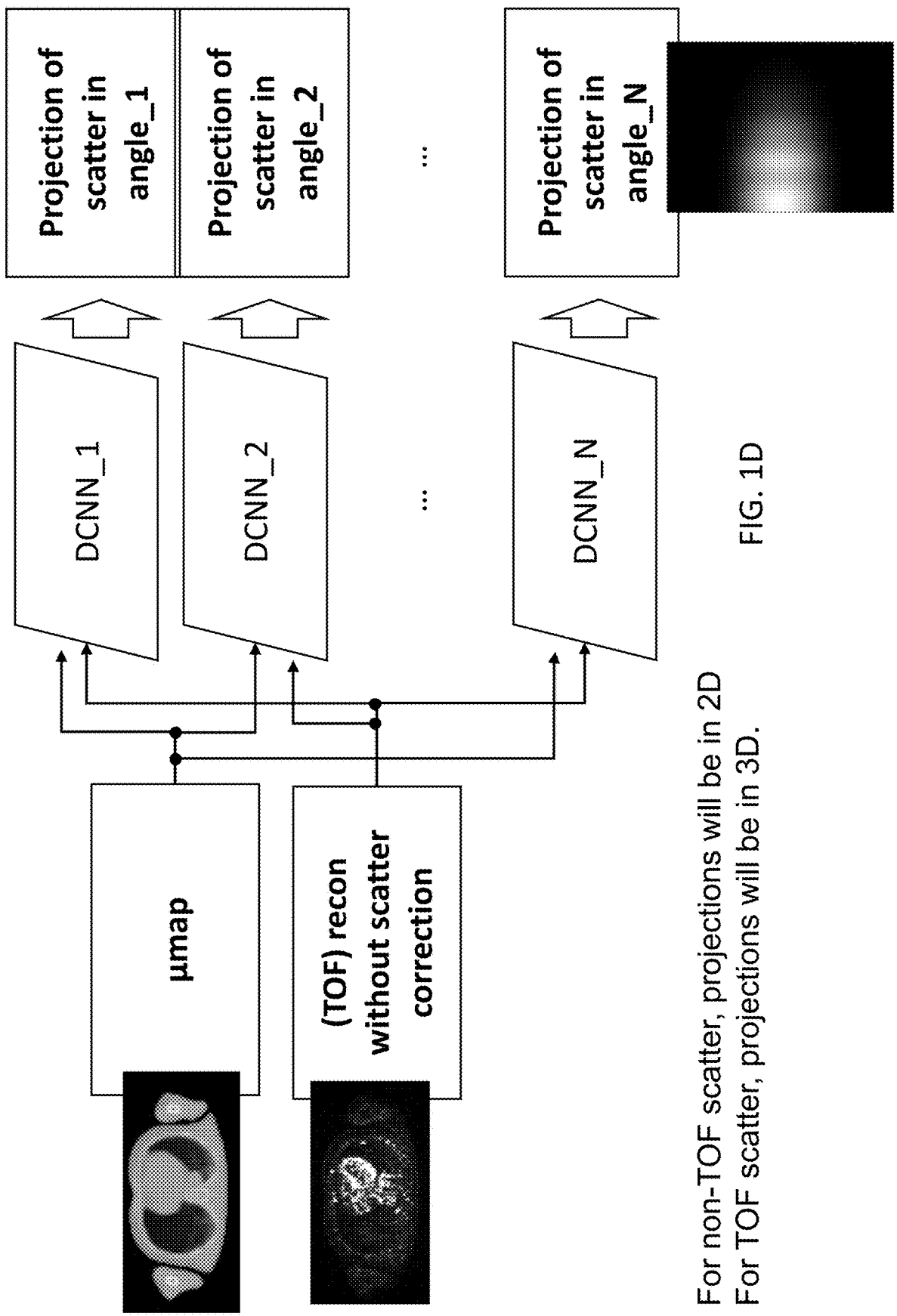
FIG. 1D shows a set of trained DCNNs directly producing estimated angle-specific projections of scatter from a nuclear medicine image (e.g., an image from a PET scan) and attenuation correction data (e.g., an attenuation image/map and/or data from a three-dimensional model of radiation attenuation) of the kinds used to train the set of trained DCNNs.

In an alternate embodiment, the single DCNN of FIG. 1B is replaced with a series of angle-specific DCNNs in order to reduce dimensions of the networks as compared to using a single network to perform calculations for all imaging angles. FIG. 1D shows a set of trained DCNNs directly producing estimated angle-specific projections of scatter from a nuclear medicine image (e.g., an image from a PET scan) and attenuation correction data of the kinds used to train the trained DCNN. The separate projections of scatter from the various angles can then be combined to produce a scatter sinogram. For non-time of flight (TOF) scatter, projections will be in two dimensions. For TOF scatter, projections will be in three dimensions.

Figure 2:
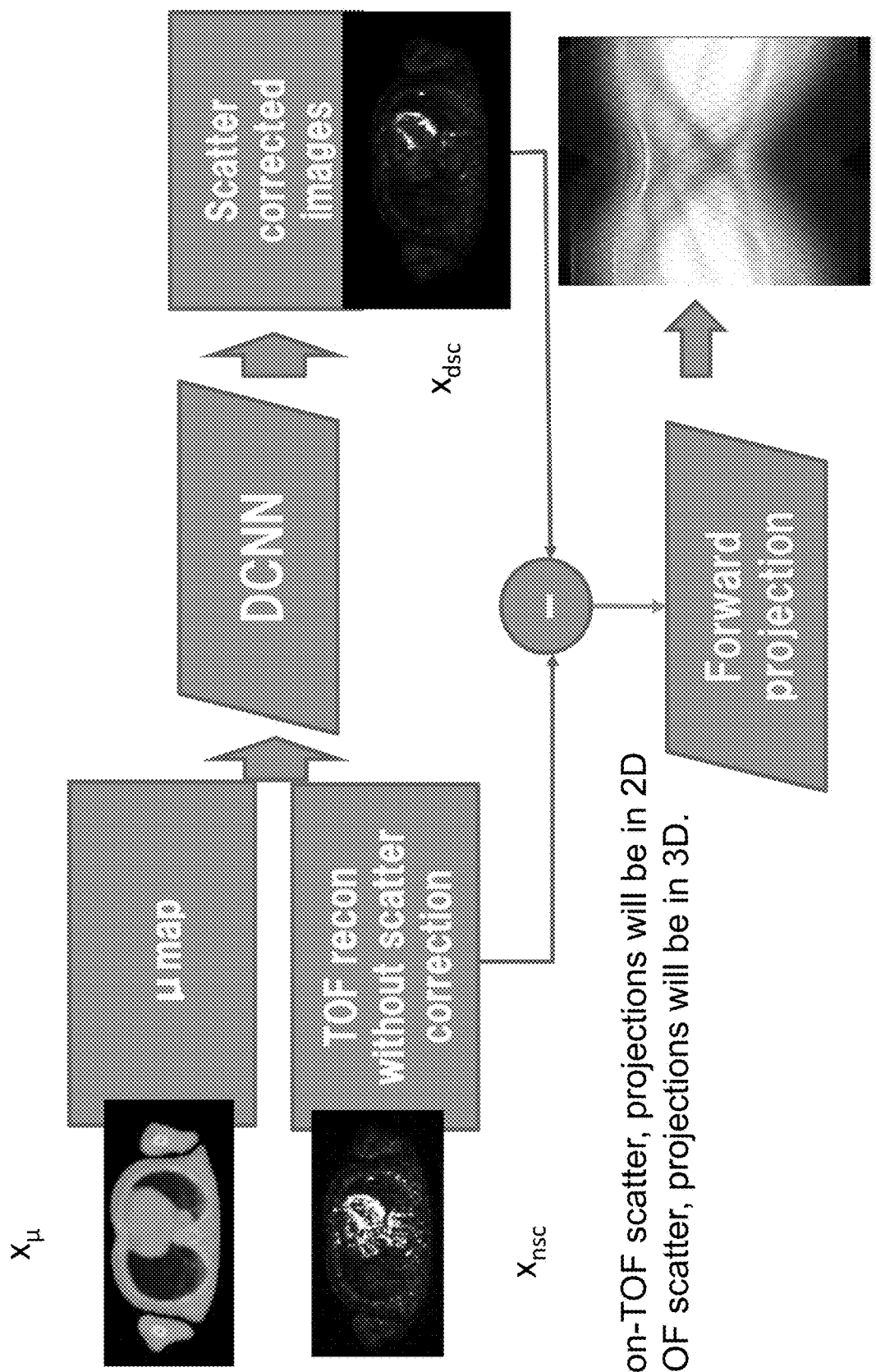
FIG. 2 shows a data flow diagram in which a scatter sinogram is created by a forward projection after a trained DCCN creates a set of scatter-corrected images from (a) a nuclear medicine image and (b) attenuation correction data, and the forward projection is applied to a set of difference images generated from the nuclear medicine image and the set of scatter-corrected images.

Rather than creating a machine learning-based system to generate a scatter sinogram, in an alternate embodiment a machine learning-based system is trained to generate scatter-corrected images instead. FIG. 2 shows a data flow diagram in which a trained DCCN creates a set of scatter-corrected images from (a) a nuclear medicine image and (b) attenuation correction data. A forward projection is then applied to a set of difference images generated from the nuclear medicine image and the set of scatter-corrected images to produce at least one set of scatter-corrected sinogram data $Px_s$. The at least one set of scatter-corrected sinogram data $Px_s$ can then be used in any number of reconstructions, including, but not limited to, a maximum likelihood expectation maximization (MLEM) reconstruction.

To train an untrained machine learning-based system to produce a corresponding scatter-corrected image, the system seeks to determine a network that produces a scatter distribution that minimizes a cost function such as:

$$\operatorname*{argmin}_{\theta} \| f_\theta(x_\mu, x_{nsc}) - x_{sc} \|_2^2. \tag{1}$$

Here, $f_\theta$ denotes a network which maps the non-scatter corrected image $x_{nsc}$ to the ground truth scatter corrected image $x_{sc}$ via supervised training. Alternatively, other cost functions may be used.

There is another input channel $x_\mu$ which includes attenuation information to aid scatter estimation/modelling. The difference images between $x_{nsc}$ and $f_\theta(x_{nsc}, x_\mu)$ have been defined as scatter distribution $x_s$. Instead of using the model-based scatter sinogram estimate, forward projection of $x_s$ is used as the pseudo scatter sinogram to perform scatter correction $$\bar{y} = Px_{sc} + Px_s + \bar{r} \tag{2}$$

where P is the system matrix and $\bar{r}$ is the expected number of random coincidences. The difference between $Px_s$ and model-based scatter sinogram is assumed to sit in the null space of the backprojector, which would not impact the reconstruction. This leads to the following scatter corrected reconstruction:

$$x_{sc}^{n+1} = \frac{x_{sc}^n}{P^T 1_M} \left[ P^T \frac{y}{P x_{sc}^n + P x_s + \bar{r}} \right] \quad (3)$$

In the maximum likelihood EM algorithm for PET, the iterative update equation is $$\bar{x}_j^{k+1} = \frac{\bar{x}_j^k}{\sum_i p_{ij}} \sum_i P_{ij} \frac{y_i}{\sum_{n=0}^{N-1} P_{in} \bar{x}_n^k} \quad (4)$$

where $y_i$ is the measured counts in ith LOR and $\bar{x}_j^k$ is the estimated activity in jth voxel at kth iteration.

Considering the scatter correction in iterative reconstruction, and estimated scatter $s_i$ from the proposed method above, then the iterative update equation with scatter correction will be:

$$\bar{x}_j^{k+1} = \frac{\bar{x}_j^k}{\sum_i p_{ij}} \sum_i P_{ij} \frac{y_i}{\sum_{n=0}^{N-1} P_{in} \bar{x}_n^k + s_i} \quad (5)$$

Figure 3:
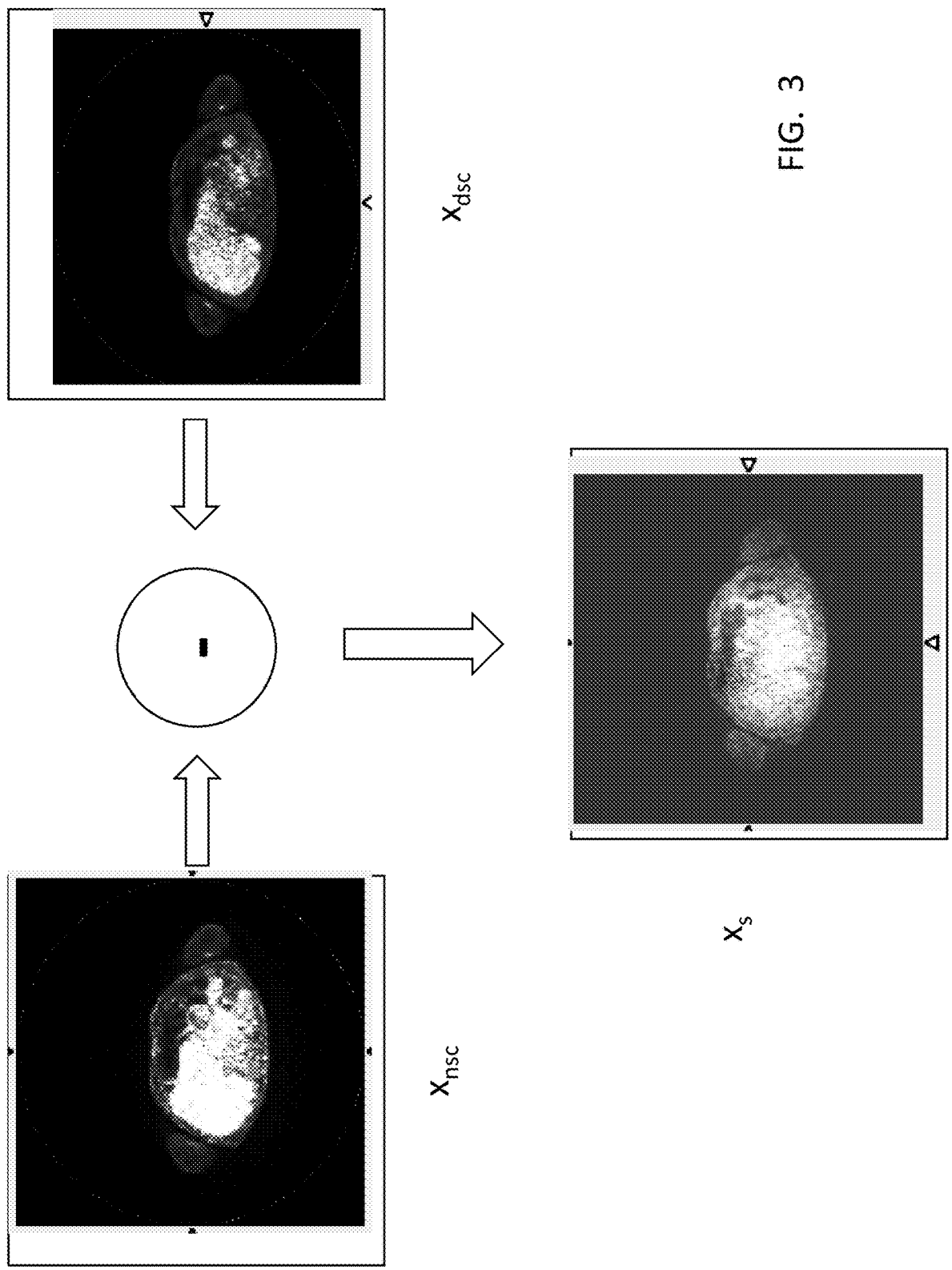
FIG. 3 shows a data diagram in which a difference image is generated from the nuclear medicine image and one of the images of the set of scatter-corrected images of FIG. 2.

FIG. 3 shows a data diagram illustrating a portion of FIG. 2. In FIG. 3, a difference image is illustrated as being generated from the nuclear medicine image and one of the images of the set of scatter-corrected images of FIG. 2. The data diagram of FIG. 4 then further illustrates a difference image of FIG. 3 undergoing forward projection to produce a pseudo scatter sinogram to perform scatter correction.

To address the timing and performance problems of known techniques, image-based scatter estimation uses smaller data sizes (3D image vs 4D/5D sinogram) as compared to sinogram-based scatter estimation. Compared to directly outputting the scatter corrected image, scatter correction is more flexible with the use of a scatter sinogram.

In one embodiment, the machine learning-based system comprises a neural network, and the trained machine learning-based system comprises a trained neural network.

In another embodiment, the machine learning-based system comprises plural neural networks, and at least one of the networks utilizes a forward projection angle-specific scatter correction as shown in FIG. 1D.

Figure 5:
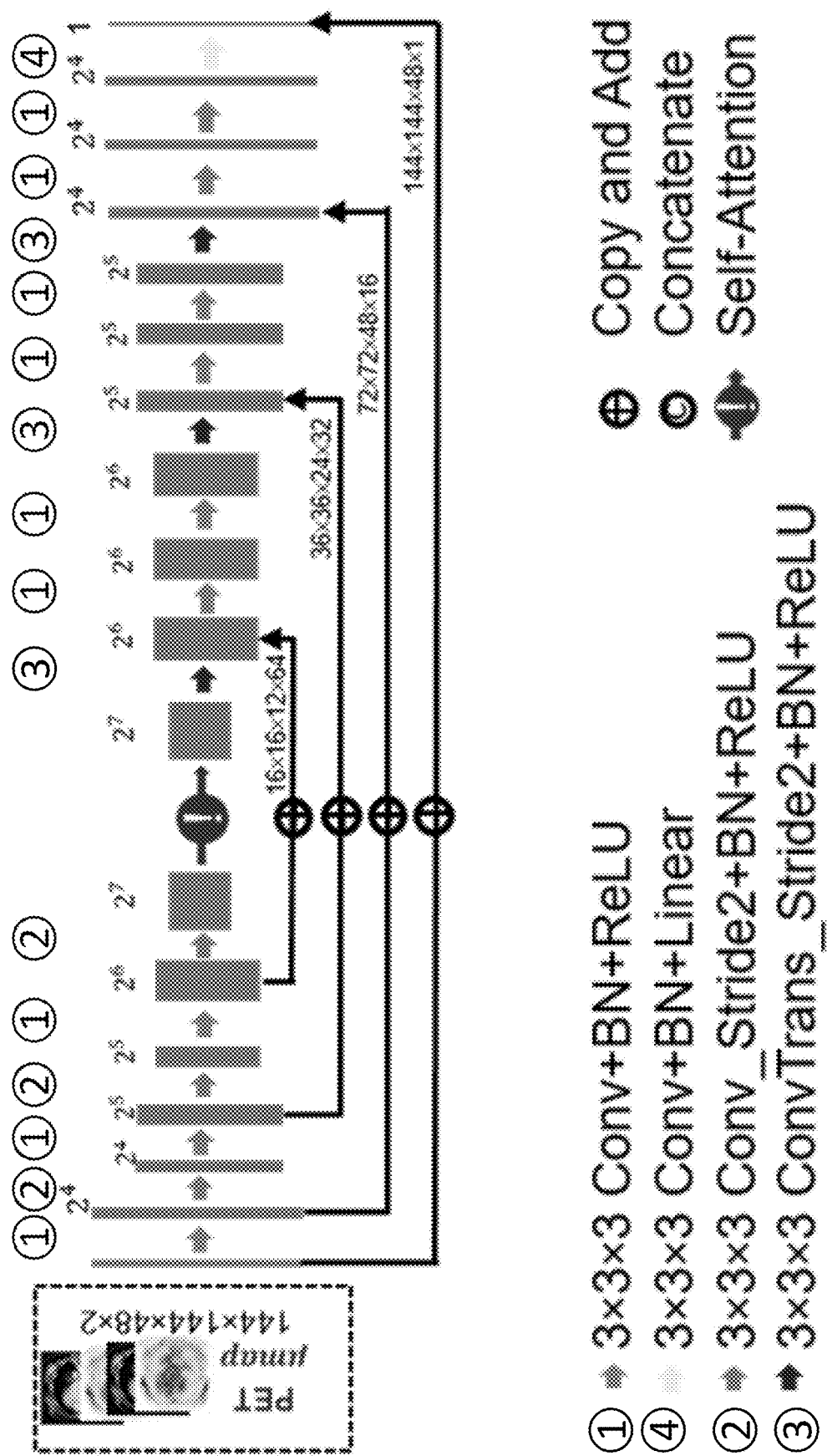
FIG. 5 shows one example architecture of a 3D deep neural network with PET/CT multi-channel input according to one implementation.

FIG. 5 shows one example architecture of a 3D deep neural network with PET/CT multi-channel input according to one embodiment of this disclosure. Shown are multiple hidden layers, and one output layer. As shown, a set of PET images and attenuation information are applied as inputs to the neural network. The illustrated neural network shows the image sizes used at the various layers and the number of connections used to interconnect the layers. The types of operations to be performed at each of the layers is also illustrated. As can be seen in the exemplary embodiments, the image sizes are reduced during the processing of a number of layers and re-expanded during subsequent layers to improve training and testing speeds. However, the images sizes need not be reduced or reduced by the amounts shown.

Figure 6:
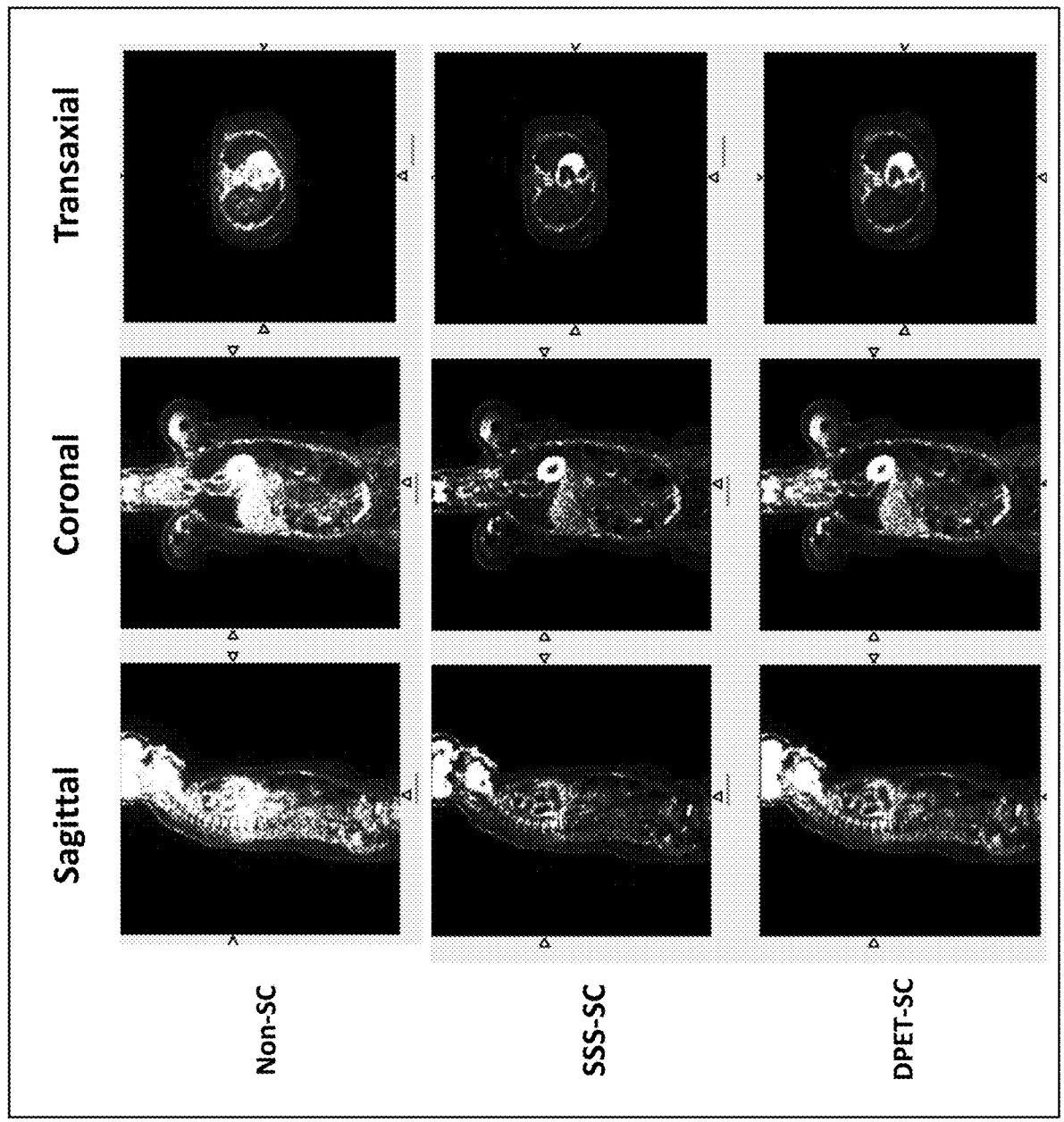
FIG. 6 shows different images of a cancer patient including imaging of the patient (1) without scatter correction (Non-SC), (2) with scatter correction using single-scatter simulation (SSS-SC), (3) with deep scatter correction (DPET-SC).

FIG. 6 shows different images of a cancer patient including imaging of the patient (1) without scatter correction (Non-SC), (2) with scatter correction using single-scatter simulation (SSS-SC), and (3) with deep scatter correction (DPET-SC).

Compared with direct estimation of the scatter sinogram using a deep neural network, the image based scatter estimation is more efficient because the image is 3D whereas the time-of-flight PET sinogram is 5D. Compared with pure image-based deep scatter correction, the hybrid approach is expected to further reduce bias.

The deep scatter correction was validated using a fluorodeoxyglucose (FDG) scan from a Canon Cartisian PET/CT scanner. A pre-trained deep scatter network was applied to the non-scatter corrected image and produced a scatter corrected image. The network prediction is comparable to the scatter corrected image using single scatter simulation with a linear regression $R^2$ of 0.97.

As shown by the images and associated measurements, the deep scatter method of this disclosure provided good image quality. The liver region is more uniform in the deep scatter corrected image than in the single-scatter simulation corrected image. In addition, the computation time for the deep scatter estimation was only 2 seconds, much faster than the single-scatter simulation method.

Figure 7A:
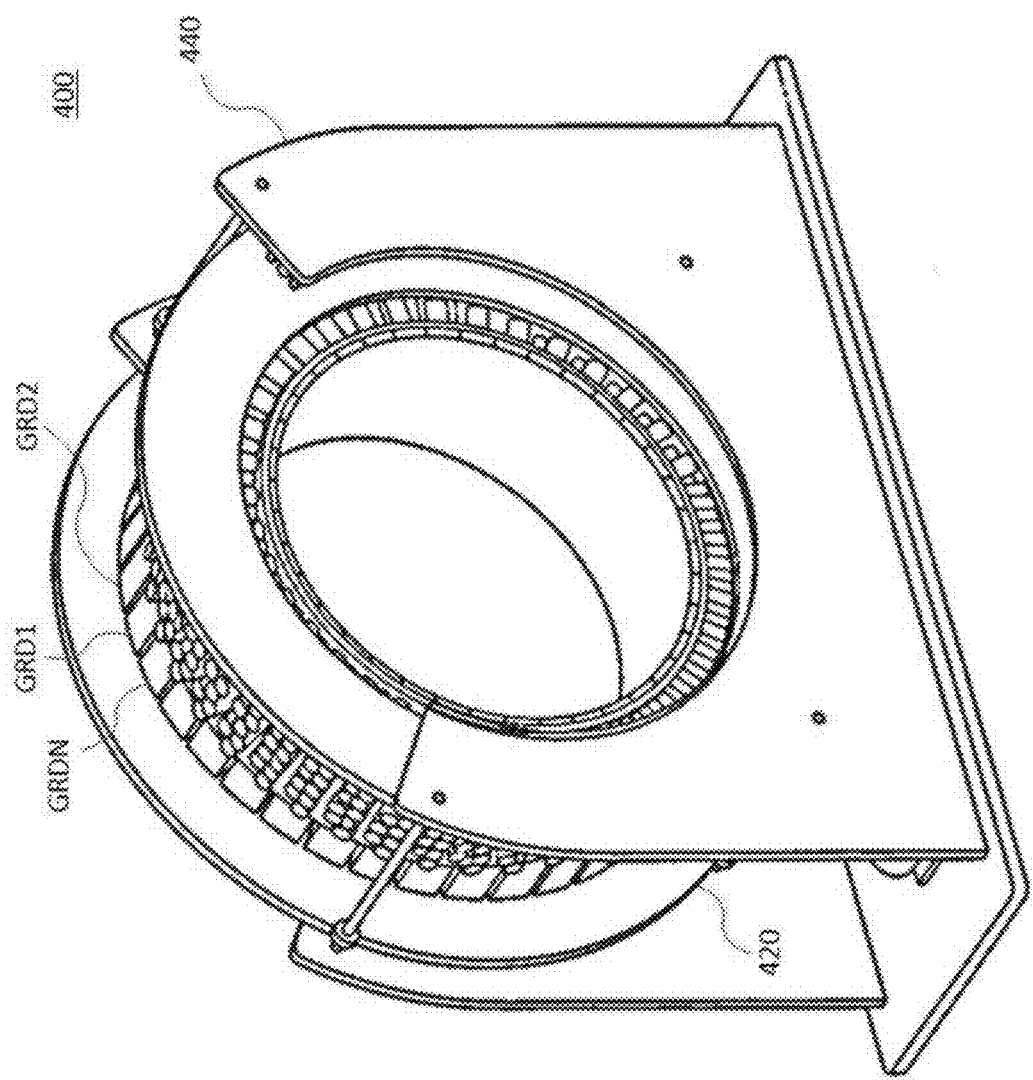
FIG. 7A shows a perspective view of a PET scanner, according to an embodiment of the present disclosure.
Figure 7B:
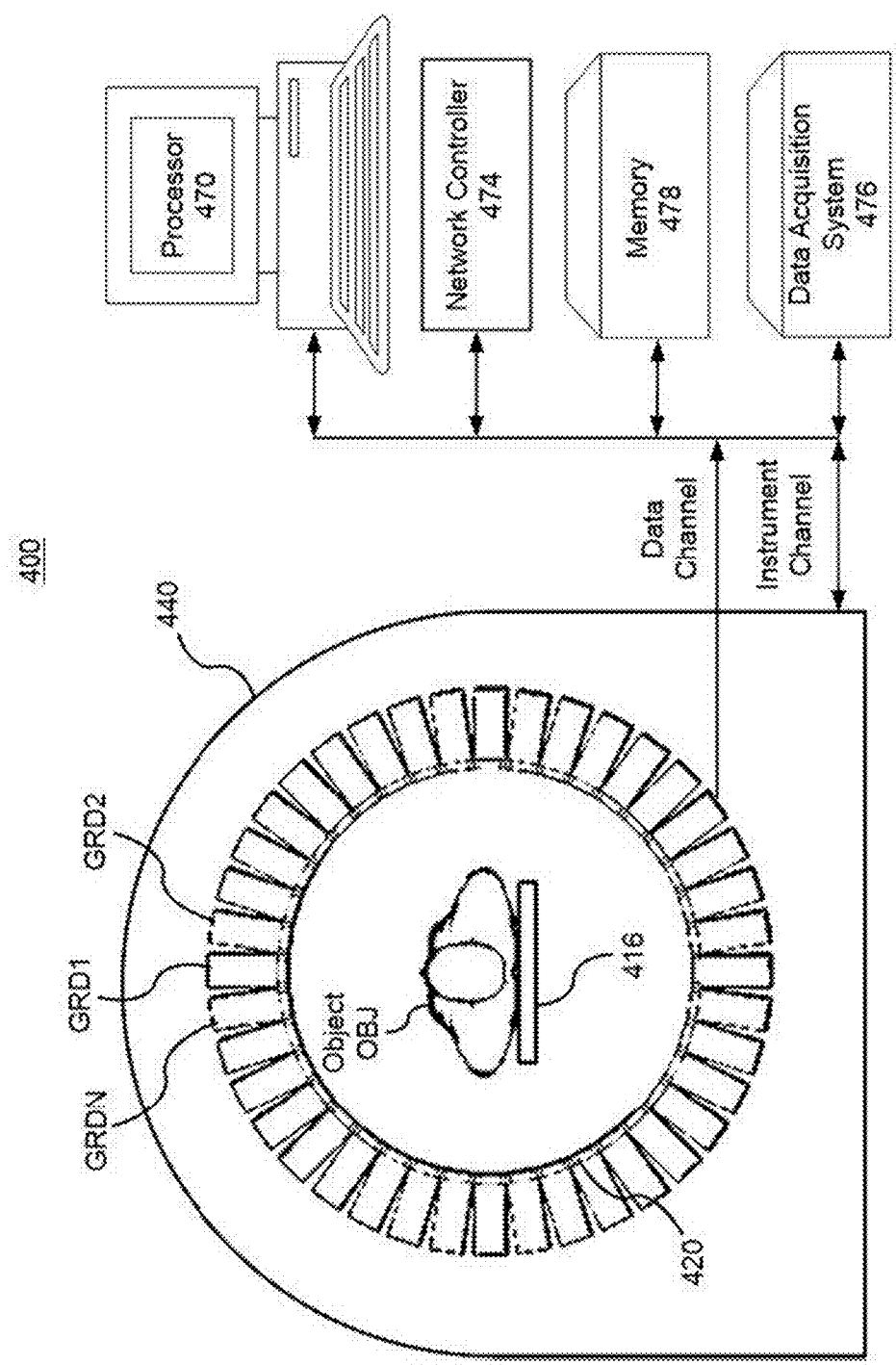
FIG. 7B shows a schematic view of a PET scanner, according to an embodiment of the present disclosure.

It can be appreciated that the above-mentioned techniques can be incorporated into various systems. In one embodiment, the above-mentioned techniques can be incorporated into a PET system. FIGS. 7A and 7B show a non-limiting example of a PET scanner 400 that can implement the methods described herein. The PET scanner 400 includes a number of gamma-ray detectors (GRDs) (e.g., GRD1, GRD2, through GRDN) that are each configured as rectangular detector modules.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 7B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 7A and 7B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 7B shows an example of the arrangement of the PET scanner 400, in which the object OBJ to be imaged rests on a table 416 and the GRD modules GRD1 through GRDN are arranged circumferentially around the object OBJ and the table 416. The GRDs can be fixedly connected to a circular component 420 that is fixedly connected to the gantry 440. The gantry 440 houses many parts of the PET imager. The gantry 440 of the PET imager also includes an open aperture through which the object OBJ and the table 416 can pass, and gamma-rays emitted in opposite directions from the object OBJ due to an annihilation event can be detected by the GRDs and timing and energy information can be used to determine coincidences for gamma-ray pairs.

In FIG. 7B, circuitry and hardware are also shown for acquiring, storing, processing, and distributing gamma-ray detection data. The circuitry and hardware include: a processor 470, a network controller 474, a memory 478, and a data acquisition system (DAS) 476. The PET imager also includes a data channel that routes detection measurement results from the GRDs to the DAS 476, the processor 470, the memory 478, and the network controller 474. The DAS 476 can control the acquisition, digitization, and routing of the detection data from the detectors. In one implementation, the DAS 476 controls the movement of the bed 416. The processor 470 performs functions including reconstructing images from the detection data, pre-reconstruction processing of the detection data, and post-reconstruction processing of the image data, as discussed herein.

In one embodiment, the processor 470 can be configured to perform various steps described herein and variations thereof. The processor 470 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 470 can execute a computer program including a set of computer-readable instructions that perform various steps described herein, the program being stored in any of the above-described non-transitory computer readable medium, electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS, and other operating systems known to those skilled in the art. Further, CPU can be implemented as multiple processors cooperatively working in parallel to perform the instructions.

The memory 478 can be a hard disk drive, CD-ROM drive, DVD drive, FLASH drive, RAM, ROM, or any other electronic storage known in the art.

The network controller 474, such as an Intel Ethernet PRO network interface card from Intel Corporation of America, can interface between the various parts of the PET imager. Additionally, the network controller 474 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The method and system described herein can be implemented in a number of technologies but generally relate to imaging devices and/or processing circuitry for performing the processes described herein. In an embodiment in which neural networks are used, the processing circuitry used to train the neural network(s) need not be the same as the processing circuitry used to implement the trained neural network(s) that perform(s) the methods described herein. For example, an FPGA may be used to produce a trained neural network (e.g. as defined by its interconnections and weights), and the processor 470 and memory 478 can be used to implement the trained neural network. Moreover, the training and use of a trained neural network may use a serial implementation or a parallel implementation for increased performance (e.g., by implementing the trained neural network on a parallel processor architecture such as a graphics processor architecture).

In the preceding description, specific details have been set forth. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Moreover, any of the elements of the appended claims may be used in conjunction with any other claim element. Rather, any limitations to embodiments of the invention are presented in the following claims.

What is claimed is:

1. A nuclear medicine diagnosis apparatus, comprising:
   processing circuitry configured to:
   receive first attenuation correction data of a subject and a first nuclear medicine image of the subject, wherein the first nuclear medicine image includes a scatter effect, and
   output a scatter sinogram indicating the scatter effect in the first nuclear medicine image by inputting both the received first attenuation correction data and the received first nuclear medicine image to a trained neural network, which outputs the scatter sinogram, wherein the trained neural network was trained by (1) inputting, as input data sets, (1a) attenuation correction training data and (1b) training nuclear medicine images that include the scatter effect, and (2) inputting a corresponding set of scatter sinogram training outputs with reduced scatter effects as compared with the training nuclear medicine images, the scatter sinogram training outputs being generated using a scatter estimation method different from the neural network.

2. The nuclear medicine diagnosis apparatus according to claim 1, wherein the trained neural network comprises at least one deep convolutional neural network (DCNN).

3. The nuclear medicine diagnosis apparatus according to claim 1, wherein the trained neural network comprises at least one deep convolutional neural network (DCNN) trained using supervised learning.

4. The nuclear medicine diagnosis apparatus according to claim 1, wherein the trained neural network comprises at least one deep convolutional neural network (DCNN) trained using supervised learning using a similarity metric.

5. The nuclear medicine diagnosis apparatus according to claim 4, wherein the similarity metric comprises at least one of a root-mean-square error, weighted sums of intensity differences, a cross correlation, an adversarial loss, and mutual information between image histograms.

6. The nuclear medicine diagnosis apparatus according to claim 1, wherein the processing circuitry is further configured to reconstruct a second nuclear medicine image by processing the scatter sinogram indicating the estimated scatter in the first nuclear medicine image.

7. The nuclear medicine diagnosis apparatus according to claim 1, wherein the set of scatter sinogram training outputs with reduced scatter effects as compared with the training nuclear medicine images are based on corresponding Monte Carlo simulations.

8. The nuclear medicine diagnosis apparatus according to claim 1, wherein the set of scatter sinogram training outputs with reduced scatter effects as compared with the training nuclear medicine images are based on model-based scatter corrections.

9. The nuclear medicine diagnosis apparatus according to claim 1, wherein the attenuation correction training data is obtained from helical computed tomography (CT) scans.

10. The nuclear medicine diagnosis apparatus according to claim 1, wherein the first nuclear medicine image of the subject is converted to a lower resolution prior to input into the trained neural network.

11. The nuclear medicine diagnosis apparatus according to claim 1, wherein the nuclear medicine diagnosis apparatus is a PET scanner.

12. The nuclear medicine diagnosis apparatus according to claim 1, wherein the processing circuitry is further configured to:
produce a difference image from (a) a scatter-corrected image with reduced scatter as compared with the first nuclear medicine image, and (b) the first nuclear medicine image; and
produce a sinogram image by forward projecting the produced difference image.

13. A method of producing a scatter-based output, the method comprising:
receiving, by a nuclear medicine diagnosis apparatus, a first attenuation correction data of a subject and a first nuclear medicine image of the subject, wherein the first nuclear medicine image includes a scatter effect, and
outputting, by the nuclear medicine diagnosis apparatus a scatter sinogram indicating the scatter effect in the first nuclear medicine image by inputting both the received first attenuation correction data and the received first nuclear medicine image to a trained neural network, wherein the trained neural network was trained by (1) inputting, as input data sets, (1a) attenuation correction training data and (1b) training nuclear medicine images that include the scatter effect, and (2) inputting a corresponding set of scatter sinogram training outputs with reduced scatter effects as compared with the training nuclear medicine images, the scatter sinogram training outputs being generated using a scatter estimation method different form the neural network.

14. The method of claim 13 wherein the trained neural network comprises at least one deep convolutional neural network (DCNN).

15. The method of claim 13 wherein the trained neural network comprises at least one deep convolutional neural network (DCNN) trained using supervised learning using a similarity metric.

16. A non-transitory computer-readable medium having instructions stored therein that, when executed by one or more processors, cause the one or more processors to:
receive a first attenuation correction data of a subject and a first nuclear medicine image of the subject, wherein the first nuclear medicine image includes a scatter effect, and
output a scatter sinogram indicating the scatter effect in the first nuclear medicine image by inputting both the received first attenuation correction data and the received first nuclear medicine image to a trained neural network, wherein the trained neural network was trained by (1) inputting, as input data sets, (1a) attenuation correction training data and (1b) training nuclear medicine images that include the scatter effect, and (2) inputting a corresponding set of scatter sinogram training outputs with reduced scatter effects as compared with the training nuclear medicine images, the scatter sinogram training outputs being generated using a scatter estimation method different form the neural network.

17. The non-transitory computer-readable medium of claim 16 having further instructions stored therein to train at least one deep convolutional neural network (DCNN) using supervised learning.

18. The nuclear medicine diagnosis apparatus according to claim 1, wherein the processing circuitry is further configured to determine a network that produces a scatter distribution that minimizes a cost function to train the trained neural network.

* * * * *